United States Patent [19]
Drake

[11] Patent Number: 5,832,062
[45] Date of Patent: Nov. 3, 1998

[54] AUTOMATED VOICE MAIL/ANSWERING MACHINE GREETING SYSTEM

[75] Inventor: Michael G. Drake, Easley, S.C.

[73] Assignee: NCR Corporation, Dayton, Ohio

[21] Appl. No.: 901,444

[22] Filed: Jul. 28, 1997

Related U.S. Application Data

[63] Continuation of Ser. No. 545,466, Oct. 19, 1995, abandoned.

[51] Int. Cl.⁶ .................................................. H04M 1/64
[52] U.S. Cl. ............................................ 379/88; 379/67
[58] Field of Search ................................ 379/67, 88, 89, 379/71, 76

[56] References Cited

U.S. PATENT DOCUMENTS

| | | | |
|---|---|---|---|
| 4,489,438 | 12/1984 | Hughes | 381/51 |
| 4,585,907 | 4/1986 | Giammarrusco . | |
| 4,598,367 | 7/1986 | DeFramcesco et al. | 364/408 |
| 4,625,081 | 11/1986 | Lotito et al. | 379/88 |
| 4,720,847 | 1/1988 | Giardina | 379/88 |
| 5,247,438 | 9/1993 | Subas et al. | 364/400 |
| 5,400,393 | 3/1995 | Knuth et al. | 379/88 |
| 5,434,908 | 7/1995 | Klein | 379/67 |
| 5,434,910 | 7/1995 | Johnson et al. | 379/88 |
| 5,436,963 | 7/1995 | Fitzpatrick et al. | 379/67 |
| 5,555,291 | 9/1996 | Inniss et al. | 379/88 |

Primary Examiner—Fan S. Tsang
Attorney, Agent, or Firm—Michael A. Kaufman

[57] ABSTRACT

An automated voice mail/answering machine greeting system includes a computer system having a real time clock, a CPU, and persistent memory that stores data representing appointment text data for potential callees. The text data may be downloaded into the memory from PIMs associated with the callees. The stored text identifies each callee, appropriate dates, time ranges, and message text, including message text flagged as personal. The stored data can also include global data such as holidays. If a callee does not answer an incoming telephone call, the present date and time are compared against any stored appointment text data for the callee. If no such data is stored, a telephone answering machine can play a default message. But if stored data exists for the present date and time, the data is retrieved from persistent memory and preferably buffered. Absent a user-input flag marking it as personal, the buffered data is converted from text to synthesized voice. A switch mechanism then couples the now vocalized data to the answering machine, which causes the vocalized data to be heard by the caller.

18 Claims, 3 Drawing Sheets

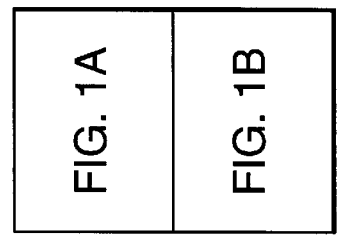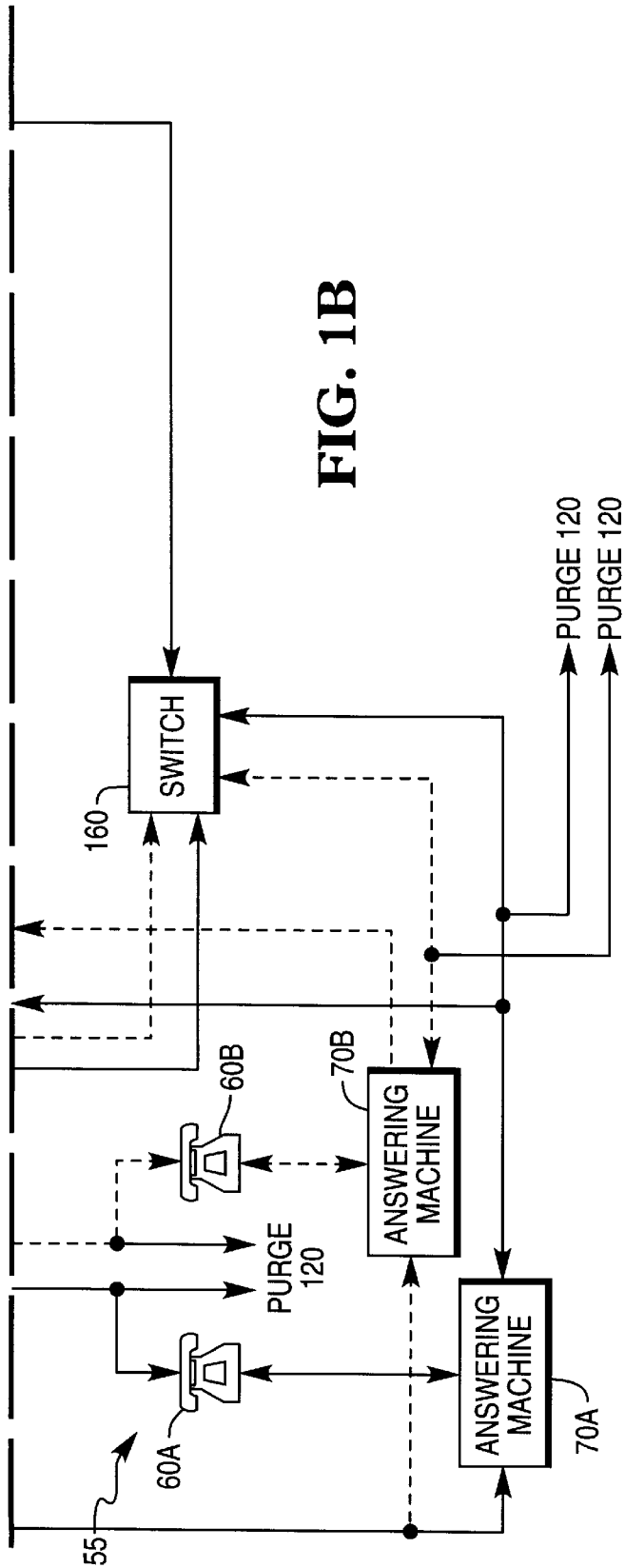

AUTOMATED VOICE MAIL/ANSWERING MACHINE GREETING SYSTEM

This is a continuation of application Ser. No. 08/545,466 filed Oct. 19, 1995, now abandoned.

FIELD OF THE INVENTION

The present invention relates generally to voice mail and telephone answering machine systems, and more particularly to methods and systems that can automatically change the greeting as a function of date and time for such systems.

BACKGROUND OF THE INVENTION

Voice mail and telephone answering machine systems are known in the art. A potential callee records or otherwise inputs a greeting into memory in such systems, e.g., "This is Mike. I cannot answer your call right now. Please leave a message and your telephone number and I will call you back." When a caller dials the callee's telephone number and the callee is unavailable or does not answer the telephone, the prerecorded message is played through the callee's telephone. The caller then knows that the callee cannot answer the telephone, and knows to leave a message.

In many instances it would be more useful to leave customized greetings that are dedicated to particular dates and times. For example, if the callee will be unavailable on May 19th from 2:00 P.M. to 3:30 P.M. for a dental appointment, it might be useful for the caller to hear a message stating "This is Martin. I will be out of the office from 2:00 P.M. to 3:00 P.M. for a doctor's appointment. Please leave any message."

Other events will occur regularly on known calendar dates. Thus, every December 24th and December 25th it would be useful to have the message state, "This is Martin. I am out of the office for the holidays until January 2nd. Have a Happy Holiday. Please leave any message."

Unfortunately, changing the greeting messages can be time consuming, especially if one wishes to record several different messages every day. For example, appointments or meetings at 9:00 A.M. to 10:30 A.M. and at 2:00 P.M. to 3:00 P.M. on a given day might preclude answering the telephone, whereas the next day the only appointments or meeting might be at 3:00 P.M. to 4:15 P.M.

On the other hand, it is becoming more common for individuals to enter appointments and other commitments into a personal computer ("PC"), into a personal information manager ("PIM"), or similar device. (Such devices shall be referred to herein collectively as PIMs.) Typically using a keyboard or touchpad, the user types in the appointment. An entry for June 19th might be: "2:00–3:00 den. appt." The entered data is then stored within the PIM, typically in database format. Regardless of how the data is stored, the relevant date, time and message are maintained together.

In many large businesses, a central computer may be used as a common memory system that receives stored appointments and the like from PIMs from a number of different individuals. Management, for example, may use such stored data to readily learn where a given individual might be at any given date and time.

On one hand, a large number of customized reminder messages may conveniently and dynamically (e.g., daily, hourly) be entered into individual PIMs and/or a central computer storage system. On the other hand, it is less convenient to dynamically enter a large number of customized greetings into a voice mail or telephone answering system.

There is a need for a system and methodology that can enable the messages stored in a PIM and/or computer system to be heard by a caller attempting to reach an unavailable callee.

The present invention discloses such a system and method.

SUMMARY OF THE INVENTION

The present invention provides a computer system having a real time clock, a central processing unit ("CPU"), and persistent memory that can receive and stare data representing appointment text data for at least one potential callee. The present invention further includes a computer program preferably stored in persistent memory, and a mechanism for coupling one or more telephone answering machines (or the equivalent) to the computer system.

The appointment text data preferably are downloaded or copied into persistent memory from one or more PIMs. One advantage of PIMs is that appointment text data is already available, and is readily and dynamically entered, often on a daily basis. The PIM-generated stored data can identify not only the callee, but also the date and time range associated with the various data. Each data entry can include a user-input flag that denotes that the associated appointment text is personal. The computer system can also store global, regularly occurring data, such as holidays.

If a callee does not answer the telephone when called, the present invention compares the present date and time against any stored appointment text data for the callee. If no data relevant to the telephone event date and time are found, the telephone answering machine plays a normal default message. However, if present for the present date and time, the appropriate stored data are retrieved from persistent memory and preferably stored in a buffer. If there is no user-input flag marking the data as personal, the buffered data are then converted from text to synthesized speech. A switch mechanism associated with the present invention then couples the now vocalized data to the answering machine, which causes the appropriate message to be heard by the caller.

The synthesized voice mechanism may be bifurcated to provide a male voice for male callees, and a female voice for female callees. If desired, voice synthesis can be made using samples of the callee's own voice.

Other features and advantages of the invention will appear from the following description in which the preferred embodiments have been set forth in detail in conjunction with the accompanying drawing.

DESCRIPTION OF THE PREFERRED EMBODIMENTS

Figure 1A:
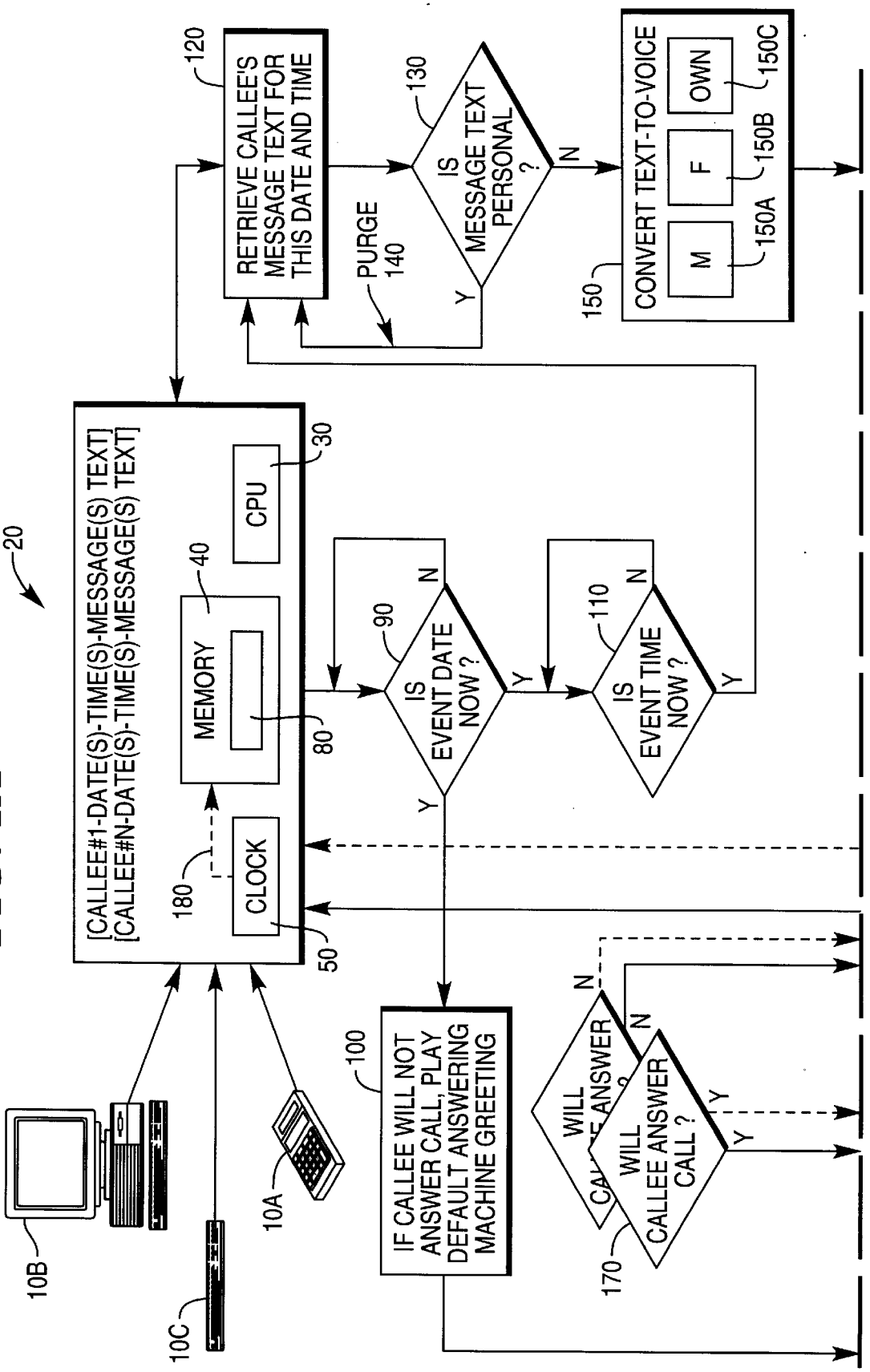
FIG. 1 is a block diagram and flow diagram of a preferred embodiment of the present invention.

FIG. 1 depicts a preferred embodiment of the present invention. One or more PIMs, 10A, 10B are coupled to a computer system 20 that includes a CPU 30, persistent memory 40, and a real time clock 50. By real time clock, it is meant that element 50 provides date and time information at all times. The PIMs may be coupled to system 20 via wires such as network or modem telephone lines, via infrared or other wireless techniques. Alternatively, the PIM memory may be copied onto a storage device, perhaps a computer diskette, whose contents are then read and stored into persistent memory 50.

As indicated by FIG. 1, the PIMs may include one or more PCs, one or more handheld devices, or may include a keyboard 10C for entry directly into persistent memory 40 within system 20. A keyboard may be useful to enter holiday dates and associated holiday greetings into memory 40. An individual user whose text messages may be stored can use more than one PIM to input data into system 20, or individual users may be associated with individual PIMs. In either event, each user is identifiable by a user code, which may include part or all of the user's name.

As will now be described, the present invention uses PIM-stored information that is readily available and dynamically maintained as message text to be heard by a telephone caller when a user (or callee) does not answer the telephone.

By way of example, a user (or callee) #1 may enter message data into PIM 10A as shown in Table 1:

TABLE 1

| 06-15-95 | Dr. appt. | 9:00 AM–10:30 AM |
| 06-19-95 | Project review meeting | 9:00 AM–1:30 PM |
| 06-19-95 | #Martin's birthday party | 2:00 PM–6:00 PM |
| 06-21-95 | Staff evaluation meeting | 2:00 PM–5:30 PM |
| 06-22095 | #Pick up Tanya at Krista's | 3:30 PM |

In the second and fifth entries above, a special symbol (here a "#") was entered by the user to flag the associated message text as being private. This flag means the user does not wish the reason for his or her unavailability at that date and time to be known by others, including by potential callers.

PIM 10A can store the above data (and additional data) with an identification tag code identifying the message texts as to user #1. Alternatively, when downloading or copying PIM 10A-generated data into persistent memory 40, an appropriate user identification tag code will be entered and associated with the relevant data within system 20. User (or callee) #2 may enter data into PC 10B (or other device) as shown in Table 2:

TABLE 2

| 6/12/95 | 1:00 PM–3:00 PM | Meet with Ed re review | |
| 6/12/95 | | Buy Tanya a gift | @ |
| 6/14/95 | 9:00 AM | Den. appt. | |
| 6/14/95 | 2:00 PM– | Proposal meeting | |
| 6/15/95 | 12:00 PM | Lunch with sect. | @ |

Comparing the sample entries in Tables 1 and 2, it is seen that the various information fields provided by PC or PIM 10A may differ somewhat in format and content from the information fields provided by PIM 10B. The date formats may differ, and in these examples, the second field for PIM 10A is text whereas it is time for PC 10B. In Table 2, a different symbol, here a "" may be used to denote private text and indeed a dedicated field for such flag symbol may exist, as shown. Similar to what was described above, PC 10B will create and store such text with an information tag code identifying the message texts as pertaining to user #2, or such a tag code will be appended when down loading the text into memory 40.

The data provided by the various PIMs are loaded into memory 40 in system 20. Data loading may occur weekly, daily, or even in real time as the various users create their data within their PIM units. It suffices that the data be stored in memory 40 before an incoming telephone call for a user (or callee) on the date and time of the data.

As shown in FIG. 1, one or more telephones 60A, 60B are coupled to system 20, preferably via one or more answering machines 70A, 70B. If desired, a common answering machine system may be used in lieu of individual, dedicated, answering machines. When a telephone call is received depicted as lightning-shaped arrow 55 as shown in FIG. 1B, e.g., by telephone 60A and answering machine 70A, the exact date and time of the start of the call is known to system 20 using information from clock 50.

Assume that the incoming telephone call is intended for callee #1, who has caused the message texts shown in Table 1 to be stored within memory 40 in system 20. Associated with the telephone number or telephone extension number of telephone 60A is an identification code that identifies the incoming call to system 20 as intended for callee #1.

According to the present invention, a software routine 80, preferably stored in a portion of memory 40, at step 90 compares any recorded message texts input by or on behalf of callee #1 (including global texts such as holiday dates and non-dedicated holiday greetings) within memory 40 against the present event date, e.g., the date of the presently incoming telephone call. If there are no stored messages relevant to the event date, the routine branches to step 100.

At step 100, the callee either answers the telephone call or does not. In practice, step 100 may be implemented as part of answering machine 70A, e.g., if telephone 60A is unanswered after, say, four rings, a default message within answering machine 70A is played. Thus, the telephone caller may hear a default message such as, "This is Mike. I cannot answer your call right now. Please leave a message and your telephone number and I will call you back."

Assume however, that step 90 determines that there is at least one message within memory 40 associated with the present event date. Software routine 80 then branches to step 110, and the relevant times of all stored messages for callee #1 are compared against the present event time, e.g., the time of the present incoming telephone call. If the present event time does not fall within a relevant window of time associated with any text in memory 40 for callee #1, step 110 simply loops, to await any next event (e.g., telephone call). As noted, in this scenario the caller will hear the default message via answering machine 70A.

Assume, however, that step 110 determines that the present event time falls within a relevant time for a message stored in memory 40 on behalf of callee #1. By "relevant time", it is meant that the event time falls within a window whose start time is the start time of an appointment text message entry and whose end time is either open ended or is the end time in the appointment text message entry.

Assume that the present (event) date is Jun. 19, 1995 and the present (event) time is 9:17 A.M. Using the Table 1 sample PIM 10A-input messages, this event date/time falls within the relevant date-time for callee #1's "Review meeting" stored text. Thus, at step 120, this particular text from callee #1 is retrieved from memory 40 and preferably copied into a scratch-pad buffer associated with step 120. The buffer may in fact be implemented within system 20.

Using the callee's identification, step 120 preferably appends to the start of each text message, text identifying the callee, e.g., "This is Mike" or "This is Helga", etc. Alternatively, such callee identification appending can be done by system 20 when storing the incoming text data within memory 40. If the event date-time cause a global message to be retrieved, for example, on December 24th, the retrieved text may automatically be "This is Helga. The office is closed today. Have a happy holiday. Please leave a message." If the callee were, say, Mike, the same global message would be retrieved as "This is Mike. The office is closed today. Have a happy holiday". Please leave any message".

Software 80 can also cause step 120 to interpret open ended text entries by appending an appropriate text statement. Thus, a PIM-entered text message for a given date stating "2:00 P.M.—Proposal meeting" can be retrieved into step 120 along with callee identification to state "This is Mike. I am at a proposal meeting starting at 2:00 P.M. Please leave any message." Alternatively, such appending can occur within system 20 when storing data within memory 40.

At step 130, a determination is made using any flag information as to whether the retrieved message text is personal. For example, on Jun. 19, 1995, if the event time were, say, 3:00 P.M. instead of 9:17 A.M., at step 120, the "Martin's birthday party" text would be retrieved but since it is flagged with a "personal" code (e.g., here the "#" symbol), at branch step 140, the retrieved, personal, text is purged. Step 130 can recognize any of a variety of flag symbols, e.g., "#" and "@" in the examples described, or software within system 20 can preconvert the variety of flag symbols to a common symbol for use by step 130. Alternatively, flag recognition can occur within system 20 such that flagged text is not retrieved at step 120, in which case step 120 would pass directly to step 150.

If, however, the relevant text does not bear a "personal" code, process step 130 proceeds to step 150. At step 150, the text message, typically ASCII characters, is converted to synthesized speech. Text-to-speech voice modules are known in the art and are readily available commercially. Some such modules 150 have the ability to automatically convert certain abbreviations to spelled-out text. For example, a text message "Dr.'s appt." can be module-recognized to mean "Doctor's appointment", and so forth. Alternatively, software within memory 40 or associated with step 120 can routinely de-abbreviate text messages as they are received, such that the stored text message is fully spelled out. In either event, the text output by step 120 would state "This is Mike. I am at a doctor's appointment until 10:30 A.M. Please leave any message".

If desired, software 80 (or other software associated with system 20) selectively delete words from a chosen list of words in a text message, including for example the word "doctor". Thus, the above message as output from step 120 could be caused to say "This is Mike. I am at an appointment until 10;30 A.M. Please leave any message" This message would be sufficiently informative to a caller, without having to reveal the exact nature of the callee's appointment. Again, software within system 20 can provide. any "a" to "an". grammatical type corrections in response to deleted words. Such software is known in the art and will not be described herein.

As indicated by sub-modules 150A, 150B, 150C, the text-to-voice conversation may be customized such that if the callee is a man, a male synthesized voice module 150A is utilized, whereas if the callee is a woman, a female synthesized voice module 150B will be used. The sex of each callee can be known to system 20 from an internal stored data base containing each callee's identification number and sex, among other data.

Optionally, modules 150C may provide speech that has been synthesized using each callee's own voice. While more expensive to implement than generic modules 150A, 150B, dedicated modules 150C would allow the telephone caller to hear the stored relevant text in a fair approximation of each callee's own voice.

At step 160, the appropriate vocalized text message is coupled to a switch mechanism 160 that is also coupled to the answering machine(s). If, at step 170, the callee answers the incoming telephone call, then switch 160 does not couple the vocalized text message to the appropriate answering machine, and the contents of buffer 120 may be purged.

However, if at step 170 the callee does not answer the call, switch 160 couples the vocalized text message into the appropriate answering machine. The answering machine then couples the vocalized text into the telephone, rather than playing the dedicated answering machine message. After the vocalized text message has played, switch 160 causes the contents of the retrieved message at step 120 to be purged. Purging can be deferred to allow the caller to have the vocalized text message replayed, if needed, with purging occurring after the caller disconnects or hangs-up.

If desired selected contents of memory 40 may be erased or purged some time after the relevant date/time associated with each text message. As shown by path 180, selective erasure or purging may occur after passage of the date associated with each message. Thus, on June 20th, all stored messages having a relevant date of June 19th may be purged. Alternatively, for archive purposes, it may be desirable to retain intact the contents of memory 40.

Figure 2:
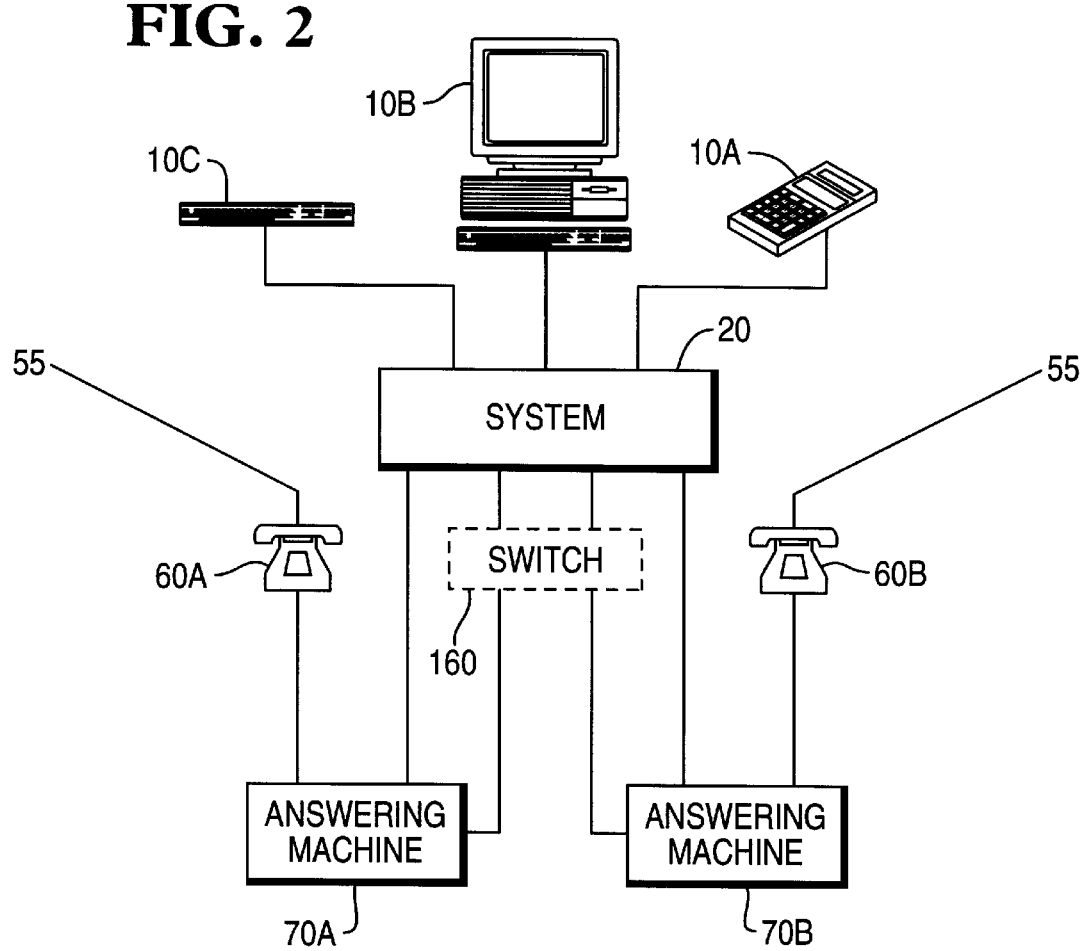
FIG. 2 is a block diagram depicting a preferred hardware implementation of the present invention.

FIG. 2 shows a preferred hardware implementation of the present invention. It is understood that the procedures depicted in FIG. 1A, steps 90, 100, 110, 120, 130, 150, and in FIG. 1B optionally switching 160 are preferably controlled by CPU 30 within system 20. In FIG. 2, switch 160 is shown as a phantom box, as the switching functions it carries out could, if desired, be implemented in software. However, conceptually, a physical switch may be easier to comprehend. Having said that, applicant notes that it may also be possible to implement either or both answering machines 70A, 70B primarily in software, also controllable by CPU 30 within system 20. Thus, in FIG. 2, lines connecting various elements are signal paths, which in some instances may be physical wires or may be wireless. Modifications and variations may be made to the disclosed embodiments without departing from the subject and spirit of the invention as defined by the following claims.

What is claimed is:

1. A method for providing an automated greeting for a voice mail or answering machine system, comprising the following steps:

(a) retrievably storing greeting text, including identification of each user providing said greeting text, and relevant date and relevant time information associated with each said greeting text;

(b) upon detection of an incoming call from a telephone directed to said user, determining incoming date and incoming time of said call;

(c) comparing said incoming date and incoming time of said call with stored greeting text for said user to identify any said stored greeting text whose associated said relevant date is identical to said incoming date of said call and to further identify any said stored greeting text whose relevant date is identical to said incoming date and whose associated said relevant time defines a time window within which said incoming time of said call occurs;

(d) retrieving any said stored greeting text identified in step (c) as having identity of said relevant date and said incoming date, and having said incoming time occurring within a window defined by said relevant time, text so identified being termed as step (c) identified greeting text, and converting any said step (c) identified greeting text to voice, wherein any of a chosen list of words in said step (c) identified greeting text may be deleted; and (e) audibly coupling to said telephone text that was converted in step (d) to voice;

wherein unless said call is answered by a human, a caller hears on said telephone text converted at step (e) as relevant to said date and time as said automated greeting.

2. The method of claim 1, wherein said greeting text is generated by a personal information manager device and is then loaded at step (a) from said device into a persistent memory from which said information may be retrieved.

3. The method of claim 1, wherein said greeting text is generated by a personal computer and is then loaded at step (a) from said personal computer into a persistent memory from which said information may be retrieved.

4. The method of claim 1, wherein greeting text retrievably stored at step (a) includes time-independent greeting text whose relevant date makes said time-independent greeting text applicable to at least one user irrespective of said incoming time, said time-independent greeting text also deemed to be said step (c) identified greeting text.

5. The method of claim 1, wherein step (a) includes storing said greeting text with any user-input flag identifying said greeting text as personal; and wherein step (d) bypasses retrieval of any text stored with a said user-input flag.

6. The method of claim 1, further including a step (f) of playing a default message to a caller if at step (c) said incoming time does not fall within said time window associated with said relevant time;

wherein step (f) occurs unless said call is otherwise answered by a human.

7. The method of claim 1, further including a step (f) of providing means for recording a message from a caller intended for said user.

8. The method of claim 1, wherein step (d) is carried out using a text-to-voice synthesizer.

9. The method of claim 8, wherein step (d) includes at least one option selected from the group consisting of (i) providing a male voice synthesizer when said user is a maie, (ii) providing a female voice synthesizer when said user is a female, (iii) providing a generic synthesizer for all users, and (iv) providing a voice synthesizer in which sound is synthesized using voice sounds from said user.

10. The method of claim 1, wherein at least before completion of step (d) if any said step (c) identified greeting text included abbreviated words, said abbreviated words are unabbreviated.

11. A system that provides an automated greeting for a voice mail or answering machine system, comprising:

a computer system including a CPU, persistent storage, and a real time clock;

said persistent storage storing greeting text, including identification of each user providing said greeting text, and storing relevant date and relevant time information associated with each said greeting text;

means for detecting an incoming call from a telephone directed to said user and for determining an incoming date and incoming time of said call;

said computer system being programmed to compare said incoming date and incoming time of said call with stored said greeting text for said user to identify any said greeting text whose said relevant date is identical to said incoming date of said call and to further identify any said greeting text whose said relevant time defines a time window within which said incoming time of said call occurs, wherein stored said greeting text so identified with respect to relevant data and relevant time is denoted as relevant date-time greeting text;

said computer system being further programmed to retrieve any said relevant date-time greeting text and being programmable to delete any of a chosen list of words in retrieved said relevant date-time greeting text;

a text-to-voice converter, coupled to receive as input retrieved said relevant date-time greeting text, and to vocalize said relevant date-time greeting text; and means for audibly coupling the vocalized said relevant date-time greeting text to said telephone unless said call is answered by a human, such that a caller hears as said automated greeting information on said telephone provided on behalf of said user relevant to said incoming date and incoming time.

12. The system of claim 11, wherein said greeting text is generated by a personal information manager device and is then loaded from said device into said persistent storage from which said information may be retrieved.

13. The system of claim 11, wherein said greeting text is generated by a personal computer and is then loaded from said personal computer into said persistent storage from which said information may be retrieved.

14. The system of claim 11, wherein greeting text retrievably stored includes time-independent greeting text whose relevant date makes said time-independent greeting text applicable to at least one user irrespective of said incoming time, wherein said time-independent greeting text is also denoted as relevant date-time greeting text.

15. The system of claim 11, wherein said greeting text includes any user-input flag identifying said greeting text as personal; and wherein said computer system is programmed to identify text associated with said user-input flag and to bypass retrieving such text for text-to-voice conversion.

16. The system of claim 11, wherein said system further includes an answering machine, coupled to play a default message over said telephone to a caller absent text to be retrieved and converted from text-to-voice, unless said call is answered by a human.

17. The system of claim 11, wherein said computer system is programmed to unabbreviate any abbreviated words in said greeting text before text-to-voice conversion occurs.

18. The system of claim 11, wherein said text-to-voice converter includes at least one characteristic selected from the group consisting of (i) said converter synthesizes a male voice when said user is a male, (ii) said converter synthesizes a female voice synthesizer when said user is a female, (iii) said converter is a generic voice synthesizer, and (iv) said converter synthesizes sound using voice sounds from said user.

* * * * *